Oct. 23, 1962    R. A. NYBORG    3,059,690
HEAT SEALING APPARATUS
Filed July 5, 1961
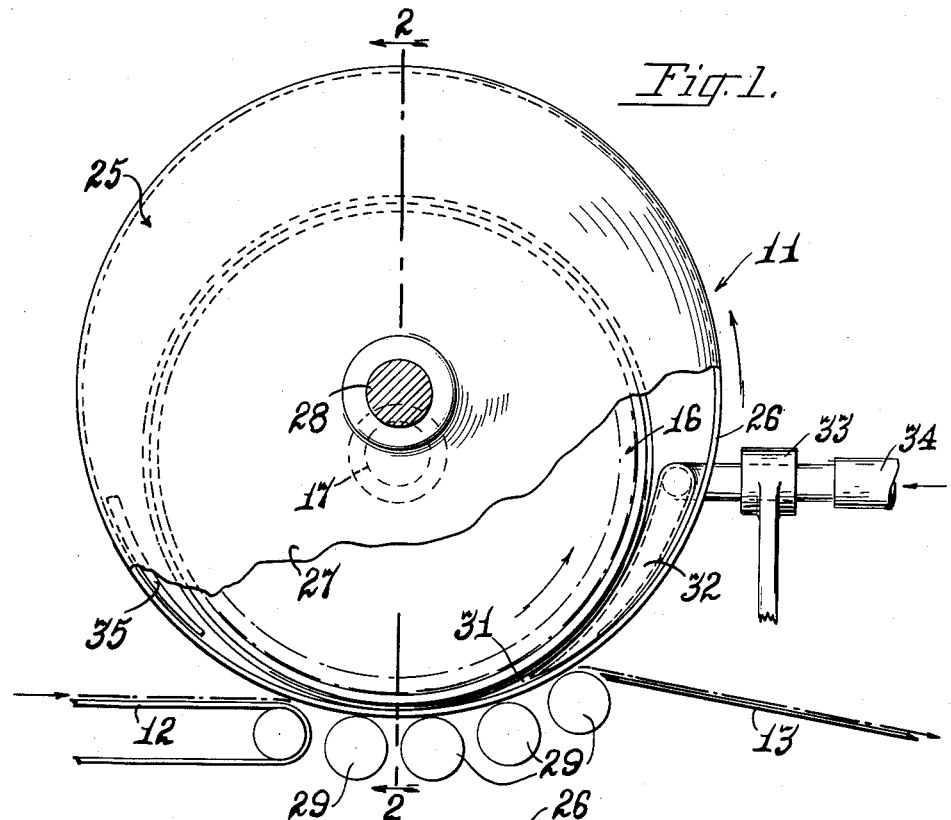
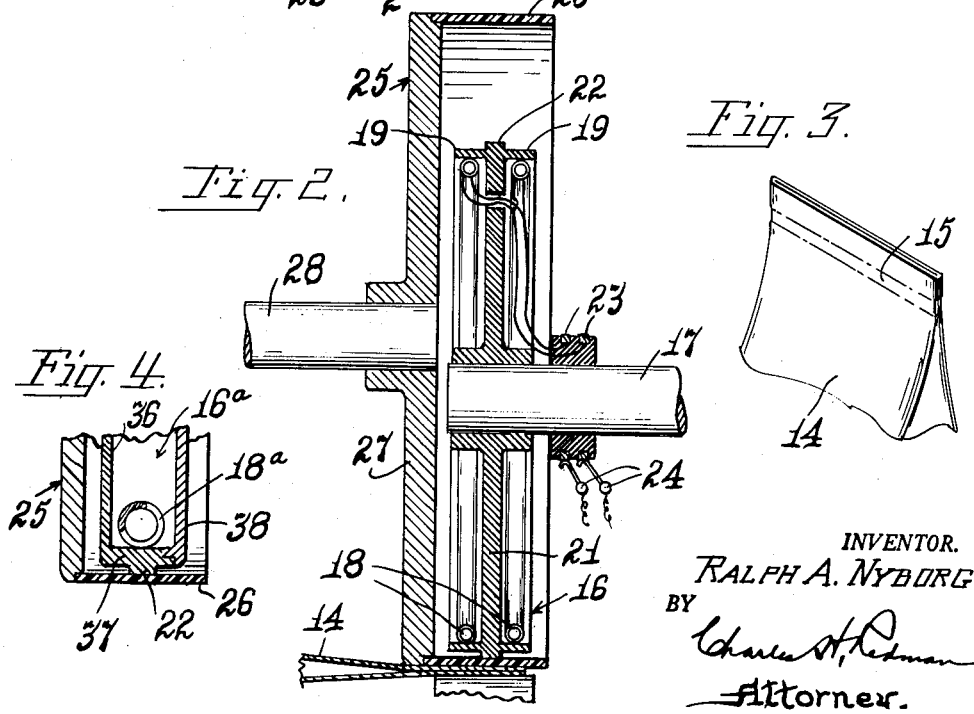
INVENTOR.
RALPH A. NYBORG
BY
Charles H. Redman
Attorney.

United States Patent Office 3,059,690
Patented Oct. 23, 1962

3,059,690
HEAT SEALING APPARATUS
Ralph A. Nyborg, 641 N. Main St., Naperville, Ill.
Filed July 5, 1961, Ser. No. 121,919
7 Claims. (Cl. 156—498)

The present invention relates to improvements in container sealing apparatus and is more particularly concerned with the novel construction, assembly and operation of apparatus for heat sealing flexible containers, such as bags or envelopes made of thermosetting plastic material and containing various kinds of merchandise.

The apparatus herein disclosed in an exemplary form is particularly adapted and designed for heat sealing bulk merchandise in bags, envelopes and like containers formed of transparent sheet cellulosic material, such as polyethylene, polyvinyl, or other thermosetting plastic film material of a nature that is susceptible of being sealed upon application of heat while being subjected to pressure. Such heat sealing is commonly practiced by various types of apparatus requiring the use of pressure elements of a nature that wrinkles or crimps the sealed area of the container. This objectionable characteristic of the heat sealed area has been found to result from slow cooling of the heat sealed area subsequent to its passing out from beneath the heat rollers or pressure plates. Various known means and mechanisms presently utilized in an attempt to avoid such wrinkling or crimping are either ineffective or are of a nature that materially increases the initial cost of the apparatus or involves high maintenance and operation costs.

It is therefore an object of the invention to provide a novelly constructed apparatus that overcomes all of the known disadvantages and objectionable characteristics of heat sealing machines now generally in use.

Another object is to provide a crimp-proof heat sealing machine that embodies a minimum number of parts and consequently is less costly to manufacture and to maintain in service.

Another object of the invention is to provide a heat sealing apparatus with novel means arranged in close association with the heat pressure means for cooling the heat sealed area of the container prior to it passing out from beneath the pressure means.

Another object is to provide a novel heat sealing apparatus of the character herein referred to with pre-heating means arranged in advance of the application of heat sealing pressure and with novel air cooling means for effecting rapid cooling of the heat sealed area prior to relief of applied pressure.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIG. 1 is an end elevational view of an exemplary apparatus embodying the features of the invention, showing parts broken away.

FIG. 2 is a diametrical sectional view of the apparatus shown in FIG. 1, taken substantially on line 2—2 of FIG. 1.

FIG. 3 is a fragmentary perspective view of a bag, envelope, or other container sealed in the present apparatus.

FIG. 4 is a fragmentary detail sectional view of a modified form of heat roll.

Referring to the exemplary disclosure in the accompanying drawings, the heat sealing apparatus generally indicated at 11 is associated with suitable carrier means such as an endless conveyor 12 operable for advancing open containers to said apparatus, and means such as a drop-off shelf 13 for conveying sealed containers to a suitable storage area or to packing machinery not shown.

As is perhaps best shown in FIG. 3, filled containers, which may be in the form of bags 14, are adapted to have the free marginal areas of their open ends joined together in a flat seam 15 while passing through the apparatus and it is commercially advantageous that said seam be flat as distinguished from being crimped or wrinkled as so often occurs when such containers are sealed by known means and apparatus.

Referring now to the embodiment of the heat sealing apparatus 11 shown in FIGS. 1 and 2, said apparatus includes a heat roll 16 mounted for rotation upon a driven shaft 17 having its axis perpendicular to the direction of travel of the conveyor 12 and located at the discharge end of said conveyor. The roll 16 may be fabricated from any suitable heat conducting material, such as aluminum, and it contains one or more heating elements, such as the electric resistance coils 18 illustrated. Calrods or other known heating elements may be used. Preferably, the heating elements 18 are arranged around the inside peripheral surface of the peripheral flanges 19 of said roll, and one on each side of a central web or hub flange 21, although other specific detail arrangement may be provided for so as to insure maximum heat transfer between the heating elements 18 and a circumferential pressure applying rib 22 formed on the outside peripheral surface of said flanges. In the present disclosure, the heating elements 18 are connected with a current source through slip rings 23 carried on shaft 17, having wiper contact with contact brushes 24.

The heat roll 16 is enclosed within a stripper drum 25 which includes a peripheral band 26 preferably comprised of fiberglass which has high heat conductivity, although other materials having the requisite heat transfer and other required characteristics may be used. However, fiberglass has been found most suitable because it will not adhere to the material of the containers with which it has had pressure contact, as hereinafter explained, thus obviating the need for separate stripper mechanism now commonly used in some known pressure heat sealing apparatus.

The peripheral band or rim 26 is essentially a thin annulus secured along one of its edges to a flanged hub 27 mounted firmly on a driven shaft 28 extending parallel to shaft 17. Rim 26 has a diameter considerably greater than that of heat roll 16 and their respective shafts 17—28 are vertically offset one from the other so that the lower perimeter of the pressure applying rib 22 of heat roll 16 is in surface to surface contact at all times with the inside peripheral surface of rim 26 to insure heat transfer to and through said rim.

Open containers 14, delivered to the apparatus by conveyor 12, are advanced beneath and are held in tight surface engagement with the outside peripheral surface of rim 26 by a series of pressure rollers 29 that are spaced apart and are of sufficient number to retain the marginal area of the open end of the containers in contact with said rim for a considerable distance during a feeding operation. In the present disclosure, such contact is maintained over approximately 50° of the surface area of the rim during which time open end of the container is heat sealed and then permitted to cool sufficiently to avoid crimping or wrinkling.

Such cooling is effected by directing a stream of cool air into the segmental space, generally indicated at 31, existing between the heat roll 16 and the rim 26. To this end, a nozzle 32, firmly mounted in a bracket 33, is disposed in said space 31 with its open end directed toward the divergence point between said roll and rim. The nozzle is suitably connected, as by a conduit 34, to any source of pressurized cool air so that, during machine operation there is a continuous blast of cool air into said space 31 for cooling rim 26 as it moves out of contact with the heat roll. The cooled rim will absorb sufficient heat from the sealed containers before they leave the last pressure roller 29 so as to prevent wrinkling or crimping.

Because rim 26 is cooled as it diverges from the heat roll it is advisable to pre-heat said rim before it is again carried into contact with said heat roll and thereby insure the transfer of sufficient heat from the heat roll through the stripper drum to effect sealing of containers successively fed through the apparatus. Such preheating may be effected by providing one or more heating elements 35 inside the perimeter of the rim 26 at a location just prior to its advance into physical contact with the heat roll 16

The heating coils may be of any wattage required for assurnig proper heating for the purposes intended and it has been found that 115 volt heaters of 2000 to 3000 watts are very effective.

In the FIG. 4 disclosure the heat roll 16a is constructed in a manner to completely enclose the heating element 18a therein. As shown, it includes a hub portion 36 peripherally flanged on one face, as at 37, and closed by an auxiliary plate 38 that is fitted snugly into said flange.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

What I claim and desire to secure by Letters Patent of the United States is:

1. Apparatus for sealing thermosetting plastic containers comprising, a heat roll rotatable on a horizontal axis, means to heat said roll, a stripper drum of heat conductive material surrounding the periphery of said heat roll, said stripper drum being of larger diameter than said heat roll and rotatable on an axis parallel to but offset from the plane of the heat roll axis so as to permit tangential contact between the roll and drum in a given area only, said heat roll and drum being rotatable at uniform speeds and in the same direction, a plurality of support rollers arranged beneath said stripper drum in the region of said tangential contact, means for feeding containers between said stripper drum and said support rolls for permanently heat sealing said containers, means to cool said stripper drum closely adjacent to the separation point of said tangential contact so as to effect cooling of the heat sealed containers prior to their passing out from between the stripper drum and support rolls, and means to preheat the stripper drum prior to its tangential engagement with the heat roll.

2. The apparatus recited in claim 1 in which the preheating means comprises an electric heater arranged between the drum and heat roll.

3. Apparatus for sealing thermosetting plastic containers comprising, a heat roll rotatable on a horizontal axis, means to heat said roll, a stripper drum of heat conductive material surrounding the periphery of said heat roll, said stripper drum being of larger diameter than said heat roll and rotatable on an axis parallel to but offset from the plane of the heat roll axis so as to permit tangential contact between the roll and drum in a given area only, said heat roll and drum being rotatable at uniform speeds and in the same direction, a plurality of support rollers arranged beneath said trigger drum in the region of said tangential contact, means for feeding containers between said stripper drum and said support rolls for permanently heat sealing said containers, and means to cool said stripper drum closely adjacent to the separation point of said tangential contact so as to effect cooling of the heat sealed containers prior to their passing out from between the stripper drum and support rolls.

4. Apparatus for sealing thermosetting plastic containers comprising, a heat roll rotatable on a horizontal axis, means to heat said roll, a stripper drum of heat conductive material surrounding the periphery of said heat roll, said stripper drum being of larger diameter than said heat roll and rotatable on an axis parallel to but offset from the plane of the heat roll axis so as to permit tangential contact between the roll and drum in a given area only, said heat roll and drum being rotatable at uniform speeds and in the same direction, a plurality of support rollers arranged beneath said stripper drum in the region of said tangential contact, means for feeding containers between said stripper drum and said support rolls for permanently heat sealing said containers, and means to pre-heat the stripper drum prior to tangential engagement with the heat roll.

5. Apparatus for heat sealing containers comprising, a heating element rotatable on a fixed axis, a stripper drum including a fiberglass rim surrounding the periphery of said heat element, said rim being of larger diameter than said heat roll and the stripper drum being rotatable on an axis parallel to but offset from the plane of the heating element axis so as to permit tangential contact between the heat element and rim in a given area only, said heat element and rim being rotatable at uniform speeds and in the same direction, a plurality of support elements arranged beneath said rim in the region of said tangential contact, means for feeding containers between said rim and said support elements for permanently heat sealing said containers, and means to cool said rim in an area closely adjacent to the separation point of said tangential contact so as to effect cooling of the heat sealed containers prior to their passing out from between the rim and support elements.

6. Apparatus for heat sealing thermosetting plastic containers comprising, a heat element rotatable on a fixed axis, a stripper drum including a rim of heat conductive material surrounding said heat element, said rim being of larger diameter than said heat element and rotatable on an axis parallel to but offset from the plane of the heat element axis so as to permit tangential contact between the element and rim in a given area only, said heat element and drum being rotatable in the same direction, container support means arranged beneath said stripper drum in the region of said tangential contact, means for feeding containers between said stripper drum and said support means for permanently heat sealing said containers, and means for directing a cool air stream against the rim of said stripper drum closely adjacent to the separation point of said tangential contact so as to cool the heat sealed containers prior to their passing out from between the stripper drum and support means.

7. Apparatus for sealing thermosetting plastic containers comprising, a heat roll and a stripper drum of heat conductive material surrounding the periphery of said heat roll and arranged eccentric thereto to afford tangential heat transfer contact between the roll and drum in a given area only, said heat roll and drum being rotatable in the same direction, support means arranged beneath said stripper drum in the region of said tangential contact, means for feeding open containers between said stripper drum and said support means for permanently heat sealing said containers, means to cool said stripper drum closely adjacent to the separation point of said tangential contact and means to pre-heat the stripper drum prior to tangential engagement with the heat roll.

References Cited in the file of this patent

UNITED STATES PATENTS

| | | |
|---|---|---|
| 2,556,008 | Spalding | June 5, 1951 |
| 2,575,251 | Arnold | Nov. 13, 1951 |
| 2,741,296 | Collins | Apr. 10, 1956 |
| 2,954,069 | Lithio | Sept. 27, 1960 |